United States Patent
Hefner, Jr. et al.

(10) Patent No.: US 8,937,145 B2
(45) Date of Patent: *Jan. 20, 2015

(54) EPOXY RESIN COMPOSITIONS

(75) Inventors: Robert E. Hefner, Jr., Rosharon, TX (US); Michael J. Mullins, Houston, TX (US); Guillaume Metral, Frankfurt (DE); Johann-Wilhelm Frey, Stade (DE); Bernd Hoevel, Sinzheim (DE)

(73) Assignee: Dow Global Technologies LLC, Midland, MI (US)

( * ) Notice: Subject to any disclaimer, the term of this patent is extended or adjusted under 35 U.S.C. 154(b) by 113 days.

This patent is subject to a terminal disclaimer.

(21) Appl. No.: 13/512,705

(22) PCT Filed: Nov. 10, 2010

(86) PCT No.: PCT/US2010/056102
§ 371 (c)(1),
(2), (4) Date: May 30, 2012

(87) PCT Pub. No.: WO2011/068644
PCT Pub. Date: Jun. 9, 2011

(65) Prior Publication Data
US 2012/0238709 A1    Sep. 20, 2012

Related U.S. Application Data

(60) Provisional application No. 61/265,799, filed on Dec. 2, 2009.

(51) Int. Cl.
C08G 59/06 (2006.01)
C08G 59/14 (2006.01)
C08G 59/18 (2006.01)
C08G 59/40 (2006.01)

(52) U.S. Cl.
CPC .......... C08G 59/182 (2013.01); C08G 59/4021 (2013.01)
USPC ............. 528/98; 528/109; 528/112; 528/119; 528/121

(58) Field of Classification Search
None
See application file for complete search history.

(56) References Cited

U.S. PATENT DOCUMENTS

| | | | |
|---|---|---|---|
| 3,018,262 A | 1/1962 | Schroeder | |
| 3,422,065 A | 1/1969 | Wulff et al. | |
| 4,438,241 A * | 3/1984 | Mark et al. | 525/444 |
| 4,638,027 A | 1/1987 | Mark et al. | |
| 4,925,901 A | 5/1990 | Bertram et al. | |
| 5,126,428 A | 6/1992 | Freitag et al. | |
| 5,369,192 A | 11/1994 | Ko et al. | |
| 5,376,453 A | 12/1994 | Von Gentzkow et al. | |
| 5,401,814 A | 3/1995 | Schomaker et al. | |
| 5,405,688 A | 4/1995 | Decker et al. | |
| 5,698,600 A | 12/1997 | Wulff et al. | |
| 5,736,620 A | 4/1998 | Earls et al. | |
| 6,063,876 A | 5/2000 | Hayakawa et al. | |
| 6,153,719 A | 11/2000 | Abbey et al. | |
| 6,242,083 B1 | 6/2001 | McGrail et al. | |
| 6,403,220 B1 | 6/2002 | Brennan | |
| 6,572,971 B2 | 6/2003 | Martin et al. | |
| 6,613,839 B1 * | 9/2003 | Gan et al. | 525/117 |
| 6,632,893 B2 | 10/2003 | Konarski et al. | |
| 6,887,574 B2 | 5/2005 | Dean et al. | |
| 7,037,958 B1 | 5/2006 | Hansen et al. | |
| 7,163,973 B2 | 1/2007 | Ahsan | |
| 7,582,706 B2 | 9/2009 | Groppel | |
| 2002/0119317 A1 | 8/2002 | Gan | |
| 2005/0171237 A1 | 8/2005 | Patel et al. | |
| 2006/0293172 A1 | 12/2006 | Rubinsztajn et al. | |
| 2007/0221890 A1 | 9/2007 | Gan | |
| 2012/0238668 A1 * | 9/2012 | Metral et al. | 523/427 |
| 2012/0289624 A1 * | 11/2012 | Metral et al. | 523/400 |

FOREIGN PATENT DOCUMENTS

| | | |
|---|---|---|
| CN | 1171219 | 5/2005 |
| CN | 101519492 | 9/2009 |
| EP | 0274209 | 7/1988 |
| EP | 2070962 | 6/2009 |
| GB | 1409835 | 10/1975 |
| JP | 2006-259249 A * | 9/2006 |
| JP | 2006259249 | 9/2006 |
| WO | 9900451 | 1/1999 |
| WO | 0125358 | 4/2001 |
| WO | 2005092826 | 10/2005 |
| WO | 2005118604 | 12/2005 |
| WO | 2006052727 | 5/2006 |
| WO | 2009045835 | 4/2009 |
| WO | 2009058715 | 9/2009 |
| WO | 2009114465 | 9/2009 |
| WO | 2011068644 | 6/2011 |

OTHER PUBLICATIONS

International Search Report and Written Opinion from related PCT application PCT/US2010/056102 dated May 18, 2011, 9 pages.
Lee, et al. "Handbook of Epoxy Resins", McGraw-Hill Book Company, New York, 1967, Chapter 2, 2-1 to 2-33.
L.R. Whittington, "Thermosetting Plastics (thermosets)", Whittington's Dictionary of Plastics, 1978, p. 314.
Ullman's Encyclopedia of Industrial Chemistry, 5th edition, vol. A9, "Dithiocarbamic Acid to Ethanol", 1987, pp. 547-563.
International Preliminary Report on Patentability from related PCT application PCT/US2010/056102 dated Jun. 14, 2012, 7 pages.

* cited by examiner

*Primary Examiner* — Robert Sellers
(74) *Attorney, Agent, or Firm* — Brooks, Cameron & Huebsch, PLLC

(57) ABSTRACT

An epoxy resin composition prepared from a dihydroxydiphenyl-cycloalkane compound to form a diglycidyl ether of dihydroxydiphenyl cycloalkane compound which may be useful for making various products including, for example, powder coatings, composites and electrical laminates.

6 Claims, No Drawings

EPOXY RESIN COMPOSITIONS

This application is a National Stage application under 35 U.S.C. 371 of PCT/US2010/056102, filed on Nov. 10, 2010 and published as WO2011/068644 A1 on Jun. 9, 2011, which claims the benefit of U.S. Provisional Application Ser. No. 61/265,799 filed Dec. 2, 2009, the entire contents of which are incorporated herein by reference in its entirety.

CROSS REFERENCE STATEMENT

This application claims the benefit of U.S. Provisional Application No. 61/265,799, filed Dec. 2, 2009, which is incorporated herein by reference.

BACKGROUND OF THE INVENTION

1. Field of the Invention

The present invention relates to epoxy resin compositions, and more specifically, the present invention relates to epoxy resin compositions including diglycidyl ethers of dihydroxydiphenyl cycloalkane compounds and advanced resin compositions and derivatives made from the epoxy resin compositions. The epoxy resin compositions may be used in a variety of applications end uses such as powder coatings, composites and electrical laminates.

2. Description of Background and Related Art

Thermoset resins, such as epoxy resins ("epoxies"), having good thermal resistant properties, are desirable for many applications such as electrical laminates, coatings, powder coatings, castings, and composites. Three desirable properties for these aryl glycidyl ethers are high glass transition temperature (Tg greater than 190° C. by dynamic mechanical thermal analysis with dicyandiamide cure), low monomer viscosity (less than 200 mPa-s at 150° C.), and high epoxy equivalent weight (EEW). Epoxies of the present invention exhibit viscosities as low as 120 mPa-s and the dicyandiamide-cured thermosets have Tgs up to 202° C. and EEWs of greater than 190 grams/equivalent (g/eq).

High Tgs are needed for applications where the thermoset will be exposed to high temperature, for example as a coating steel pipe used for transporting hot oil. The properties of the thermoset degrade precipitously above the temperature of the Tg. Resins having a low viscosity make it easier to process them into a finished part, and easy processability is always desirable. Also, adhesion to metals and glass is usually better for low viscosity thermosets because wetting of the complex microstructure of the substrate is better. Finally, epoxy resins with high EEWs give thermosets with a relatively low concentration of hydroxyls in the backbone. Hydroxyls are formed during typically curing reactions of epoxy resins, such as with dicyandiamide, a multifunctional amine. There is a direct relationship between hydroxyl concentration in a thermoset and water absorption. High water absorption is undesirable in most applications because it can reduce adhesion and degrade other properties.

There are many aryl glycidyl ethers that achieve these properties individually, but not that meet them all properties simultaneously. This balance of properties is difficult to achieve. For example, one common strategy for high Tg is to use polyglycidyl ethers of highly functional polyphenols, especially phenol formaldehyde novolacs which are known as epoxy novolacs. However, examples of such novolacs that have viscosities of less than 200 cP are not capable of achieving high Tgs comparable to the epoxy resins of the present invention. For example, D.E.N.™ 438 (trademark of The Dow Chemical Company), an industry standard epoxy novolac, has a viscosity of <200 mPa-s but the Tg of the dicyandiamide-cured thermoset is only 173° C.

Accordingly, there is still a need in the industry to develop new thermoset resins that are difunctional and provide thermosets with a balance of properties including high Tg (>190° C.), low monomer viscosity (<150 mPa-s at 150° C.) and high EEW (>190 g/eq).

SUMMARY OF THE INVENTION

The present invention meets the challenging goals simultaneously of providing a class of epoxy thermoset resins that are difunctional and of low viscosity (<150 mPa-s at 150° C.) and high EEW (>190 g/eq) and give thermosets with high Tg (>150° C.).

One embodiment of the present invention is directed to an epoxy resin composition represented by the following general chemical structure of Formula I, such as for example, epoxy resins prepared from a dihydroxydiphenyl-cycloalkane compound:

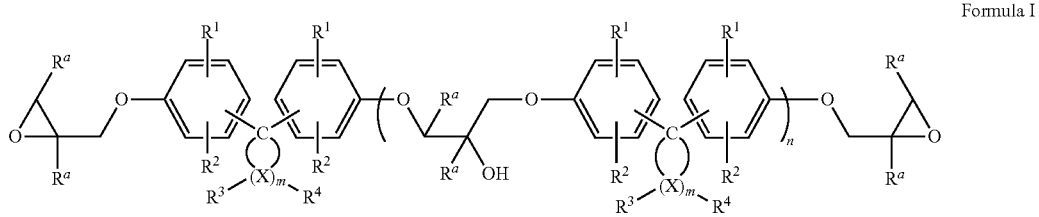

Formula I wherein $R^a$ is a hydrogen or methyl group; $R^1$ and $R^2$, independently from each other, each represents a hydrogen atom, a halogen, a substituted or unsubstituted alkyl group, a substituted or unsubstituted aryl group, or a substituted or unsubstituted aralkyl group; a nitrile group; a nitro group; a substituted or unsubstituted alkoxy group; X is $CH_2$, $CH(R^3)$, or $C(R^3)(R^4)$; m is an integral number between 8 and 20; and $R^3$ and $R^4$, independently from each other, each represents a hydrogen atom, a halogen, a substituted or unsubstituted alkyl group, a substituted or unsubstituted aryl group, or a substituted or unsubstituted aralkyl group; and n is an integer having a value from 0 to about 10.

Another embodiment of the present invention is directed to advanced resin compositions and derivatives of the epoxy resin composition of Formula I above. For example, two other additional embodiments of the present invention are directed to compositions that can be prepared by reacting the above epoxy resin composition of Formula I with either (a) a stoichiometric deficiency of a difunctional epoxy-reactive compound to give a composition of Formula II or (b) a stoichiometric excess of a difunctional epoxy-reactive compound to give a composition of Formula III.

Formula II

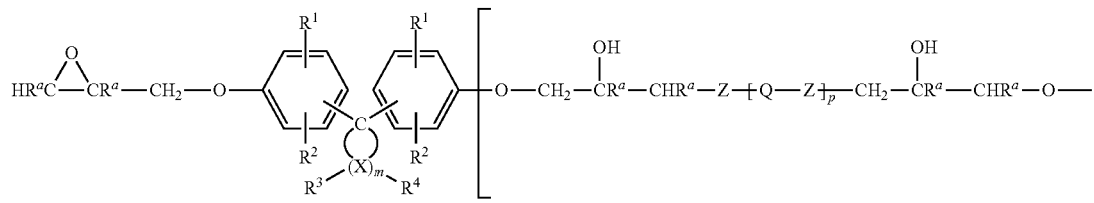

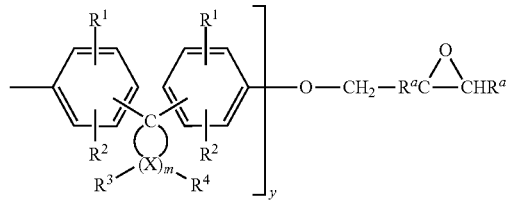

Formula III

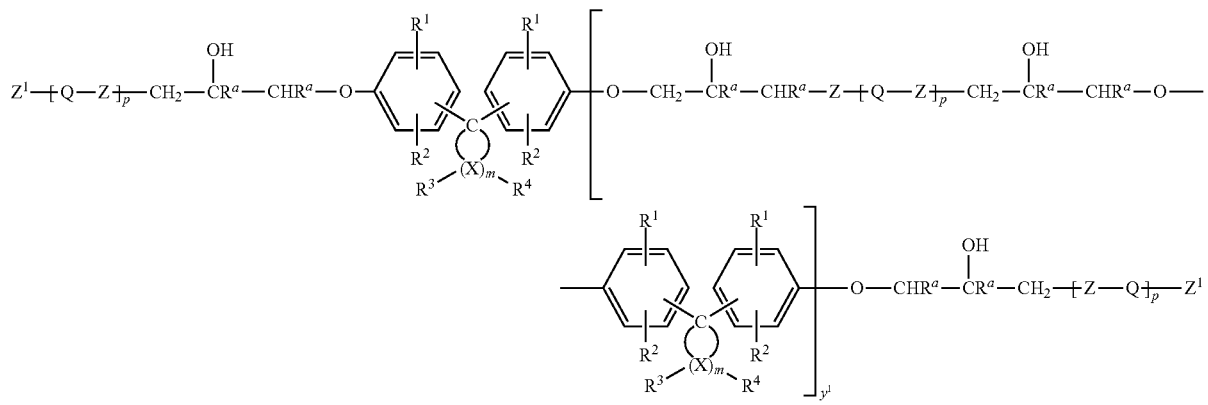

wherein $R^a$, $R^1$, $R^2$, $R^3$, $R^4$, X, and m are as defined in Formula I; p and y are integers having a value from 1 to about 20; $y^1$ is an integer having a value from 0 to about 20; Q is a hydrocarbylene moiety; each Z is independently selected from the group consisting of O, S, —$NR^b$, wherein $R^b$ is a hydrocarbyl moiety; and $Z^1$ is Z—H.

Yet another embodiment of the present invention is directed to a thermosettable resin composition comprising (a) the epoxy resin composition of Formula I above and (b) at least one curing agent (hardener).

Still another embodiment of the present invention is directed to a cured thermoset resin product made from the above thermosettable resin composition.

DETAILED DESCRIPTION OF THE INVENTION

In its broadest scope, the present invention includes an epoxy resin composition represented by the following Formula I:

wherein $R^a$ is a hydrogen or methyl group; $R^1$ and $R^2$, independently from each other, each represents a hydrogen atom, a halogen, a substituted or unsubstituted alkyl group, a substituted or unsubstituted aryl group, or a substituted or unsubstituted aralkyl group; a nitrile group; a nitro group; a substituted or unsubstituted alkoxy group; X is $CH_2$, $CH(R^3)$, or $C(R^3)(R^4)$; m is an integral number between 8 and 20; and $R^3$ and $R^4$, independently from each other, each represents a hydrogen atom, a halogen, a substituted or unsubstituted alkyl group, a substituted or unsubstituted aryl group, or a substituted or unsubstituted aralkyl group; and n is an integer having a value from 0 to about 10.

In the Formula I above, the substituted or unsubstituted alkyl group, a substituted or unsubstituted aryl group, or a substituted or unsubstituted aralkyl group for $R^1$-$R^4$ and the substituted or unsubstituted alkoxy group for $R^1$ and $R^2$ may include, for example, a $C_1$-$C_8$ alkyl or alkyloxy group, a $C_6$-$C_{10}$ aryl group, or a $C_7$-$C_{12}$ aralkyl group.

Formula I

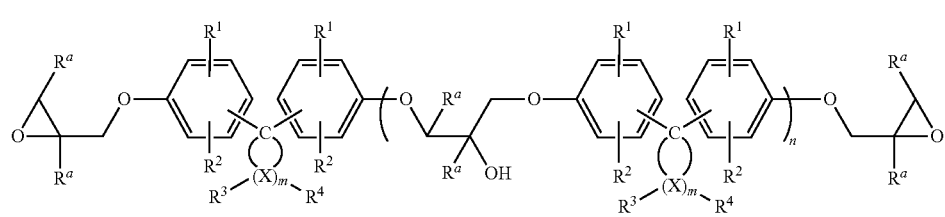

Examples of the diglycidyl ethers of dihydroxydiphenyl-cycloalkane compounds represented by the Formula I described above, may include for example, the diglycidyl ethers of isomeric dihydroxydiphenyl-cyclooctanes, dihydroxydiphenyl-cyclononanes, dihydroxydiphenyl-cyclodecanones, dihydroxydiphenyl-cyclododecanes, dihydroxydiphenyl-cyclopentadecanes, dihydroxydiphenyl-cyclooctadecanes, dihydroxydiphenyl-cycloeicosanes, dihydroxydiphenyldimethyl-cyclododecanes, dihydroxydiphenyl-tetrabromo-cyclododecanes, dihydroxydiphenyldimethoxy-cyclododecanes, dihydroxydiphenyldimethyldibromo-cyclododecanes; and mixtures thereof.

As typically prepared the epoxy resins of Formula I are a mixture of oligomers with varying n. The average value of n in the mixture depends on the process used to make these resins. In the most common application of the present invention, the proportion of the mixture that has molecular chains with n greater than 0 is less than 10%. This gives a relatively low viscosity material with a high concentration of reactive epoxy. However, it is also possible to make mixtures wherein most of the chains have n values of more than zero. This gives a mixture with relatively high viscosity and low concentration of epoxy.

In one embodiment, a process for preparing an epoxy resin composition of Formula I comprises reacting (a) at least one epoxy resin and (b) at least one compound having an average of more than one reactive hydrogen atom per molecule, excluding an epoxy functionality, wherein the reactive hydrogen atom is reactive with an epoxide group in said epoxy resin composition represented by Formula I. In the above process, the at least one epoxy resin, component (a), may include for example diglycidyl ethers of bisphenol A, diglycidyl ethers of tetrabromobisphenol A, polyglycidyl ethers of polyphenols; and mixtures thereof. The polyglycidyl ethers of polyphenols may comprise phenol novolacs, cresol novolacs, bisphenol A novolacs, or mixtures thereof.

In the above process, the at least one compound having an average of more than one reactive hydrogen atom per molecule, component (b), may include for example a bisphenol compound. The bisphenol compound, component (b), may comprise a bisphenol compound represented by the following general Formula IV:

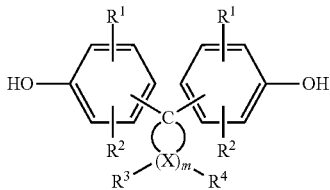

Formula IV wherein R1 and R2, independently from each other, each represents a hydrogen atom, a halogen, a substituted or unsubstituted alkyl group, a substituted or unsubstituted aryl group, or a substituted or unsubstituted aralkyl group; X is $CH_2$, CH(R3), or C(R3)(R4); m is an integral number between 8 and 20; and R3 and R4, independently from each other, each represents a hydrogen atom, a halogen, a substituted or unsubstituted alkyl group, a substituted or unsubstituted aryl group, or a substituted or unsubstituted aralkyl group.

In another embodiment, the bisphenol compound may include a compound having from about C8 to about C20 carbon atoms. In yet another embodiment, the bisphenol compound may be a compound prepared from a cycloalkane compound comprising cyclooctanone, cyclodecanone, cyclododecanone, cyclopentadecanone, cyclooctadecanone, cycloeicosanone, and mixtures thereof. For example, the bisphenol compound, component (b), may comprise a bisphenol cyclododecanone compound.

In another embodiment, the process of preparing the epoxy resin composition of Formula I above comprises reacting (A) an epihalohydrin compound such as an epichlorohydrin or epibromohydrin; and (B) one or more phenolic hydroxyl compounds, for example, a bisphenol compound such as a bisphenol represented by Formula IV below.

In one embodiment, the bisphenol compound, component (B), useful for preparing the epoxy resin composition of Formula I above of the present invention, may be any of the compounds represented by the following Formula IV:

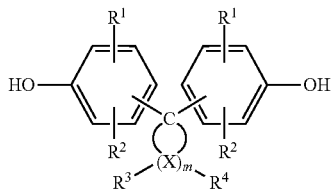

Formula IV wherein $R^1$, $R^2$, $R^3$, $R^4$, X, and m are as defined in Formula I. Such bisphenols are typically made by the well known condensation reaction of cyclic ketones with phenols. Specific examples of suitable bisphenols of Formula IV may include compounds derived from the reaction with of cyclooctanone, cyclodecanone, cyclododecanone, cyclopentadecanone, cyclooctadecanone, cycloeicosanone, and mixtures thereof with phenol. One preferred example of the bisphenol compound useful in the present invention is a bisphenol cyclododecanone.

Preferred examples of the bisphenol compound useful in the present invention may include condensation products of cyclododecanone with phenols such as phenol, o-cresol, m-cresol, p-cresol, 2,4-dimethylphenol, 2,6-dimethylphenol, and naphthol.

The resulting epoxy resin composition represented by Formula I comprises a diglycidyl ether of a bisphenol compound which may be used as a component for preparing a thermosettable resin composition by mixing with a curing agent component.

In preparing the epoxy resin composition of Formula I above of the present invention, generally, the bisphenol compound, component (B), may be used in an amount of from about 10 wt % to about 98 wt %; preferably, from about 15 wt % to about 97 wt %; and more preferably, from about 20 wt % to about 97 wt % based on the total weight of the composition.

Methods known in the art, such as the method described in Pham and Marks, "Epoxy Resins", Encyclopedia of Polymer Science and Technology, Vol. 9, John Wiley & Sons, may be used for conversion of bisphenols to the epoxy resins of Formula I of the present invention. Generally speaking, either a "caustic coupling process" or a process that uses phase transfer catalysts can be used. These processes require a base such as sodium hydroxide (NaOH). Although NaOH is most common, other bases may be used in the processes, including, for example, Group I and Group II metal hydroxides, oxides, carbonates, bicarbonates, methoxides, amine bases such as diazobicycloundecene (DBU). As is well known in the art, the choice of process can have an influence on the concentration of oligomers and other side-products such as vicinal diols, chlorohydrins, chlorides, and other chlorinated species present in the epoxy resin product.

For some applications, for example in adhesives for electronic components, it is desirable to have low total chlorine and ionic chloride concentrations. Methods developed primarily for bisphenol A diglycidyl ether, such as described in U.S. Pat. No. 7,582,706 can be used.

In addition, by choice of process it is possible to adjust the molecular weight of the product (related to "n" in Formula I). For applications where low viscosity is advantageous such as for liquid coatings, casting materials or composites, it is desirable to have the concentration of oligomers (n>0) at a low concentration (less than 50%). This can be accomplished by methods well known in the art that involve using a high stoichiometric ratio of epihalohydrin to bisphenol of greater than about 2:1. In some applications, for example in powder coatings, it is desirable to have higher viscosities and therefore a higher concentration of oligomer (n>0). One method to make these oligomers is to use a "taffy process" as described in the above reference by Pham and Marks. Generally speaking, the taffy process involves the use of stoichiometric ratios (epihalohydrin:bisphenol) of less than 2:1.

Another embodiment of the present invention is directed to an advanced epoxy resin composition including the reaction product of (I) a stoichiometric excess of one or more of the epoxy resin compositions represented by Formula I above; and (II) one or more compounds having an average of more than one reactive hydrogen atom per molecule, excluding an epoxy functionality, wherein the reactive hydrogen atom is reactive with an epoxide group in said epoxy resin composition represented by Formula I above.

One embodiment of the component (II) may be a phenolic hydroxyl-containing compound such as a bisphenol.

stituted or substituted cycloalkenyl, an unsubstituted or substituted di or polycycloalkenyl, or an unsubstituted or substituted aromatic ring. By "hydrocarbyl moiety" used herein it is meant a monovalent radical, more specifically, any monovalent moiety selected from the group consisting of an unsubstituted or substituted alkyl, an unsubstituted or substituted cycloalkyl, an unsubstituted or substituted polycycloalkyl, an unsubstituted or substituted alkenyl, an unsubstituted or substituted cycloalkenyl, an unsubstituted or substituted di or polycycloalkenyl, or an unsubstituted or substituted aromatic ring.

The advanced epoxy resin composition of Formula II is an advanced epoxy resin product prepared from (I) one or more epoxy resins of Formula I with (II) one or more suitable compounds having an average of more than one reactive hydrogen atom per molecule, wherein the reactive hydrogen atom is reactive with an epoxide group in said epoxy resin. The epoxy resin used in the advancement reaction may additionally include (III) any one or more of known epoxy resins, such as, for example, the diglycidyl ethers of dihydroxyaromatic compounds which are different from the epoxy resins of Formula I. The preparation of the aforementioned advanced epoxy resin products can be performed using known methods.

Examples of the compound having an average of more than one reactive hydrogen atom per molecule include dihydroxyaromatic, dithiol, disulfonamide, diamide or dicarboxylic acid compounds or compounds containing one primary amine or amide group, two secondary amine groups, one secondary amine group and one phenolic hydroxy group, one secondary amine group and one carboxylic acid group, or one phenolic hydroxy group and one carboxylic acid group, and any combination thereof.

Formula II

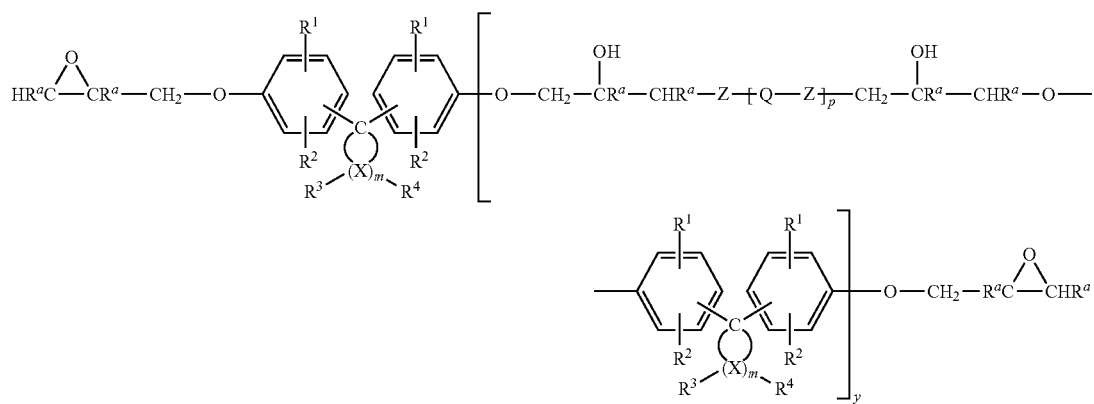
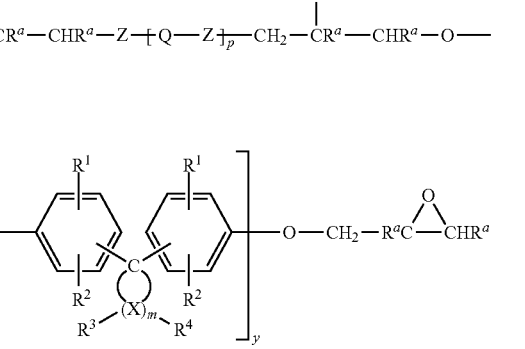

wherein $R^a$, $R^1$, $R^2$, $R^3$, $R^4$, X, and m are as defined in Formula I, y is an integer having a value from 1 to about 20; p is an integer having a value of 1 to about 20; Q is a hydrocarbylene moiety; and each Z is independently selected from the group consisting of O, S, —$NR^b$, wherein $R^b$ is a hydrocarbyl moiety.

By "hydrocarbylene moiety" as used herein it is meant any divalent radical formed by removing two hydrogen atoms from a hydrocarbon. More specifically the hydrocarbylene moiety is a divalent moiety selected from the group consisting of an unsubstituted or substituted alkyl, an unsubstituted or substituted cycloalkyl, an unsubstituted or substituted polycycloalkyl, an unsubstituted or substituted alkenyl, an unsub- The stoichiometric ratio of the compound having an average of more than one reactive hydrogen atom per molecule to the epoxy resin is generally from about 0.01:1 to about 0.95:1, preferably from about 0.05:1 to about 0.8:1, and more preferably from about 0.10:1 to about 0.5:1 equivalents of the reactive hydrogen atom per equivalent of the epoxide group in the epoxy resin.

The advancement reaction may be conducted in the presence or absence of a solvent, optionally a catalyst, and with the application of heat and mixing. The advancement reaction may be conducted at atmospheric, superatmospheric or subatmospheric pressures and at temperatures of from about 20°

C. to about 260° C., preferably, from about 80° C. to about 240° C., and more preferably from about 100° C. to about 200° C.

The time required to complete the advancement reaction depends upon factors such as the temperature employed, the chemical structure of the compound having more than one reactive hydrogen atom per molecule employed, and the chemical structure of the epoxy resin employed. Higher temperature may require shorter reaction time whereas lower temperature may require a longer period of the reaction time.

In general, the time for the advancement reaction completion may range from about 5 minutes to about 24 hours, preferably from about 30 minutes to about 8 hours, and more preferably from about 30 minutes to about 4 hours.

A catalyst may also be added in the advancement reaction. Examples of the catalyst may include phosphines ($R_3P$), quaternary ammonium compounds ($R_4N^+X^-$), phosphonium compounds ($R_4P^+X^-$) and tertiary amines ($R_3N$). Specific examples of suitable phosphonium salts include tetraphenylphosphonium chloride, triphenylmethylphosphonium chloride, methyltritolylphosphonium chloride, tetramethylammonium chloride, tetraethylammonium chloride, tetrabutylammonium chloride, trinethylammonium chloride, triethylammonium chloride, tributylammonium chloride, and related salts where the anion is bromide, acetate, benzoate, and hydroxide. The catalyst may be employed in quantities from about 0.01 to about 3, preferably from about 0.03 to about 1.5, and more preferably from about 0.05 to about 1.5 percent by weight based upon the total weight of the epoxy resin and compound having an average of more than one reactive hydrogen atom per molecule.

Other details concerning an advancement reaction useful in preparing the advanced epoxy resin product for the resin compound which may be employed in the present invention are given in U.S. Pat. No. 5,736,620 and *Handbook of Epoxy Resins* by Henry Lee and Kris Neville, incorporated herein by reference.

Examples of the aromatic di and polyhydroxyl containing compound include the dihydroxydiphenyl-cycloalkanes derived from the reaction with of cyclooctanone, cyclodecanone, cyclododecanone, cyclopentadecanone, cyclooctadecanone, cycloeicosanone, and mixtures thereof with phenol; hydroquinone; resorcinol; catechol; 2,4-dimethylresorcinol; 4-chlororesorcinol; tetramethylhydroquinone; bisphenol A (4,4'-isopropylidene-diphenol); 4,4'-dihydroxydiphenylmethane; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,1-bis(4-hydroxyphenyl)-1-phenylethane; 4,4'-bis(4(4-hydroxyphenoxy)-phenylsulfone)diphenyl ether; 4,4'-dihydroxydiphenyl disulfide; 3,3',3,5'-tetrachloro-4,4'-isopropylidenediphenol; 3,3',3,5'-tetrabromo-4,4'-isopropylidene-diphenol; 3,3'-dimethoxy-4,4'-isopropylidenediphenol; 4,4'-dihydroxybiphenyl; 4,4'-dihydroxyalpha-methylstilbene; 4,4'-dihydroxybenzanilide; bis(4-hydroxy-phenyl)terephthalate; N,N'-bis(4-hydroxyphenyl)terephthalamide; bis(4'-hydroxy-biphenyl)terephthalate; 4,4'-dihydroxyphenylbenzoate; bis(4'-hydroxyphenyl)-1,4-benzene-diimine; 1,1'-bis(4-hydroxyphenyl) cyclohexane; phloroglucinol; pyrogallol; 2,2',5,5'-tetrahydroxydiphenylsulfone; tris(hydroxyphenyl)methane; dicyclopentadiene diphenol; tricyclopentadienediphenol; and any combination thereof.

Examples of the di- and polycarboxylic acids include 4,4'-dicarboxydiphenyl-methane, terephthalic acid, isophthalic acid, 1,4-cyclohexanedicarboxylic acid, 1,6-hexanedicarboxylic acid, 1,4-butanedicarboxylic acid, dicyclopentadiene-dicarboxylic acid, tris(carboxyphenyl)methane, 1,1-bis(4-carboxyphenyl)cyclohexane, 3,3',5,5'-tetramethyl-4,4'-dicarboxydiphenyl, 4,4'-dicarboxy-alpha-methylstilbene, 1,4-bis(4-carboxyphenyl)-trans-cyclohexane, 1,1'-bis(4-carboxyphenyl)cyclohexane, 1,3-dicarboxy-4-methylbenzene, 1,3-dicarboxy-4-methoxybenzene, 1,3-dicarboxy-4-bromobenzene, 4,4'-benzanilidedicarboxylic acid; 4,4'-phenylbenzoatedicarboxylic acid; 4,4'-stilbenedicarboxylic acid and any combination thereof.

Examples of the di- and polymercaptans include 1,3-benzenedithiol, 1,4-benzenedithiol, 4,4'-dimercaptodiphenylmethane, 4,4'-dimercaptodiphenyl oxide, 4,4'-dimercapto-alpha-methylstilbene, 3,3',5,5'-tetramethyl-4,4'-dimercaptodiphenyl, 1,4-cyclohexanedithiol, 1,6-hexanedithiol, 2,2'-dimercaptodiethylether, 1,2-dimercaptopropane, bis(2-mercaptoethyl)sulfide, tris(mercaptophenyl)methane, 1,1-bis(4-mercaptophenyl)cyclohexane, and any combination thereof.

Examples of the di- and polyamines include 1,2-diaminobenzene, 1,3-diaminobenzene, 1,4-diaminobenzene, 4,4'-diaminodiphenylmethane, 4,4'-diaminodiphenylsulfone, 2,2'-diaminodiphenylsulfone, 4,4'-diaminodiphenyl oxide, 3,3',5,5'-tetramethyl-4,4'-diaminodiphenyl, 3,3'-dimethyl-4,4'-diaminodiphenyl, 4,4'-diamino-alpha-methylstilbene, 4,4'-diaminobenzanilide, 4,4'-diaminostilbene, 1,4-bis(4-aminophenyl)-trans-cyclohexane, 1,1-bis(4-aminophenyl)cyclohexane, tris(aminophenyl)methane, 1,4-cyclohexanediamine, 1,6-hexanediamine, piperazine, ethylenediamine, diethyletriamine, triethylenetetramine, tetraethylenepentamine, 1-(2-aminoethyl)piperazine, bis(aminopropyl)ether, bis(aminopropyl)sulfide, bis(aminomethyl)norbornane, 2,2'-bis(4-aminocyclohexyl)propane, and any combination thereof.

Examples of the primary monoamines include aniline, 4-chloroaniline, 4-methylaniline, 4-methoxyaniline, 4-cyanoaniline, 2,6-dimethylaniline, 4-aminodiphenyl oxide, 4-aminodiphenylmethane, 4-aminodiphenylsulfide, 4-aminobenzophenone, 4-aminodiphenyl, 4-aminostilbene, 4-amino-alpha-methylstilbene, methylamine, 4-amino-4'-nitrostilbene, n-hexylamine, cyclohexylamine, aminonorbornane, and any combination thereof.

Examples of the sulfonamides include phenylsulfonamide, 4-methoxyphenylsulfonamide, 4-chlorophenylsulfonamide, 4-bromophenylsulfonamide, 4-methylsulfonamide, 4-cyanosulfonamide, 4-sulfonamidodiphenyl oxide, 4-sulfonamidodiphenylmethane, 4-sulfonamidobenzophenone, 4-sulfonylamidodiphenyl, 4-sulfonamidostilbene, 4-sulfonamidoalpha-methylstilbene, 2,6-dimethyphenyl-sulfonamide, and any combination thereof.

Examples of the aminophenols include o-aminophenol, m-aminophenol, p-aminophenol, 2-methoxy-4-hydroxyaniline, 3-cyclohexyl-4-hydroxyaniline, 2,6-dibromo-4-hydroxyaniline, 5-butyl-4-hydroxyaniline, 3-phenyl-4-hydroxyaniline, 4-(1-(3-aminophenyl)-1-methylethyl)phenol, 4-(1-(4-aminophenyl)ethyl)phenol, 4-(4-amino-phenoxy)phenol, 4-((4-aminophenyl)thio)phenol, (4-aminophenyl)(4-hydroxy-phenyl)methanone, 4-((4-aminophenyl)sulfonyl)phenol, 4-(1-(4-amino-3,5-dibromophenyl)-1-methylethyl)-2,6-dibromophenol, N-methyl-p-aminophenol, 4-amino-4'-hydroxy-alpha-methylstilbene, 4-hydroxy-4'-amino-alpha-methylstilbene, 3,5-dimethyl-4-hydroxyaniline, and any combination thereof.

Examples of the aminocarboxylic acids include 2-aminobenzoic acid, 3-aminobenzoic acid, 4-aminobenzoic acid, 2-methoxy-4-aminobenzoic acid, 3,5-dimethyl-4-aminobenzoic acid; 3-cyclohexyl-4-aminobenzoic acid; 2,6-dibromo-4-aminobenzoic acid; 5-butyl-4-aminobenzoic acid; 3-phenyl-4-aminobenzoic acid; 4-(1-(3-aminophenyl)-1- methylethyl)benzoic acid; 4-(1-(4-aminophenyl)ethyl) benzoic acid; 4-(4-amino-phenoxy)benzoic acid, 4-((4-aminophenyl)thio)benzoic acid, (4-aminophenyl)(4-carboxy-phenyl)methanone; 4-((4-aminophenyl)sulfonyl) benzoic acid; 4-(1-(4-amino-3,5-dibromo-phenyl)-1-methylethyl)-2,6-dibromobenzoic acid; N-methyl-4-aminobenzoic acid; 4-amino-4'-carboxy-alpha-methylstilbene; 4-carboxy-4'-amino-alpha-methylstilbene; glycine; N-methylglycine; 4-aminocyclohexanecarboxylic acid; 4-aminohexanoic acid; 4-piperidinecarboxylic acid; 5-aminophthalic acid; and any combination thereof.

Examples of the sulfanilamides include o-sulfanilamide, m-sulfanilamide, p-sulfanilamide, 2-methoxy-4-aminobenzoic acid, 3-methyl-4-sulfonamido-1-aminobenzene, 5-methyl-3-sulfonamido-1-aminobenzene, 3-phenyl-4-sulfonamido-1-aminobenzene, 4-(1-(3-sulfonamidophenyl)-1-methylethyl)aniline, 4-(1-(4-sulfonamido-phenyl)ethyl) aniline, 4-(4-sulfonamidophenoxy)aniline, 4-((4-sulfonamido-phenyl)thio)aniline, (4-sulfonamidophenyl)(4-aminophenyl)methanone, 4-((4-sulfonamidophenyl) sulfonyl)aniline, 4-(1-(4-sulfonamido-3,5-dibromophenyl)-1-methylethyl)-2,6-dibromoaniline, 4-sulfonamido-1-N-methylaminobenzene, 4-amino-4'-sulfonamido-alpha-methylstilbene, 4-sulfonamido-4'-amino-alpha-methylstilbene, 2,6-dimethyl-4-sulfonamido-1-aminobenzene, and any combination thereof.

Still another embodiment of the present invention is directed to an advanced reactive resin composition including the reaction product of (1) a stoichiometric deficiency of one or more of the epoxy resin compositions represented by Formula I above with (2) one or more compounds having an average of more than one reactive hydrogen atom per molecule, excluding an epoxy functionality, wherein the reactive hydrogen atom is reactive with an epoxide group in said epoxy resin composition represented by Formula I above. The resulting advanced reactive resin composition may be represented by the following general chemical structure of Formula III:

to provide an advanced reactive resin composition of Formula III may be selected, for example, from any of the hydroxyl-containing compounds described above.

Preferably, the hydroxyl-containing compound used in the present invention is a bisphenol such as bisphenol A, bisphenol F, tetrabromobisphenol A, bisphenol S and mixtures thereof.

In general, the advanced reactive compound having an average of more than one reactive hydrogen atom per molecule, component (2), used to form the advanced reactive resin composition of Formula III is employed in a stoichiometric ratio (2:1) is generally from about 1:0.01 to about 1:0.95, preferably from about 1:0.05 to about 1:0.8, and more preferably from about 1:0.10 to about 1:0.7.

The epoxy resins represented by the above described Formula I may be used in preparing the advanced reactive resin composition of Formula III.

Preferred examples of the epoxy resins which fall within the scope of the above Formula I for preparing the advanced reactive resin composition of Formula III include the diglycidyl ether of cyclododecanone bisphenol.

It will be apparent to one skilled in the art that if a 1:1 ratio of the advanced reactive resin compound having an average of more than one reactive hydrogen atom per molecule to the epoxy resin represented by Formula I above, a resin composition containing both a terminal end with a functional group such as a hydroxyl group and a terminal end with an epoxy group may result. It is contemplated that the scope of the present invention covers such embodiments.

According to one first embodiment of the present invention, a thermosettable epoxy resin composition, i.e., a curable or a hardenable composition, of the present invention disclosed herein, may comprise (a) at least one epoxy resin composition of the above Formula I; and (b) at least one curing agent.

According to another second embodiment of the present invention, a thermosettable advanced epoxy resin composition of the present invention disclosed herein, may comprise

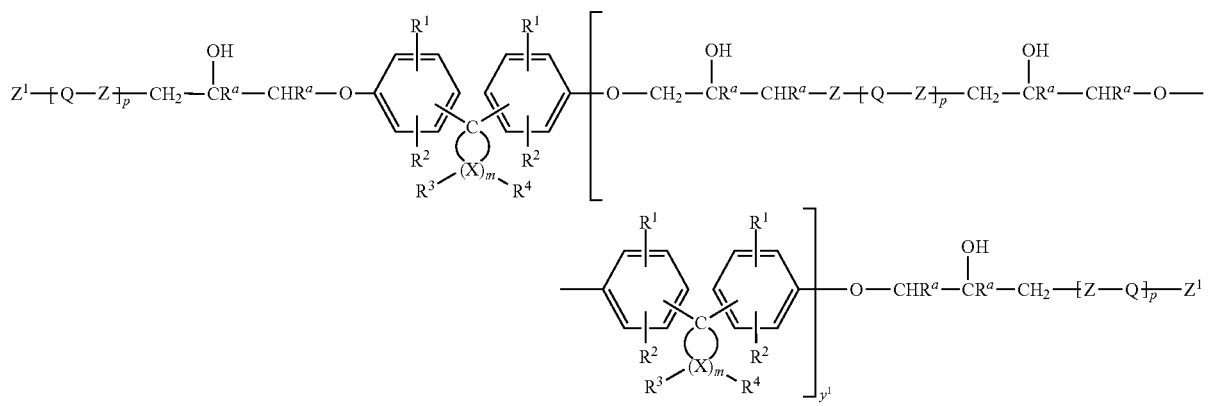

wherein $R^a$, $R^1$, $R^2$, $R^3$, $R^4$, X, p and m are as defined in Formula II, $y^1$ is an integer having a value from 0 to about 20; Q is a hydrocarbylene moiety; each Z is independently selected from the group consisting of O, S, —$NR^b$, wherein $R^b$ is a hydrocarbyl moiety; and $Z^1$ is Z—H.

The terms "hydrocarbylene moiety" and "hydrocarbyl moiety" are used as hereinbefore defined.

The compounds having an average of more than one reactive hydrogen atom per molecule useful as component (2) suitable for reacting with the resin composition of Formula I (i) at least one advanced epoxy resin composition of the above Formula II; and (ii) at least one curing agent.

According to still another third embodiment of the present invention, a thermosettable advanced reactive resin composition of the present invention disclosed herein, may comprise (x) at least one epoxy resin and (y) at least one advanced reactive resin composition of the above Formula III.

Optionally, any of the embodiments of the thermosettable compositions above may include (c) at least one thermoset resin different from any of the epoxy resins of components (a), (i) or (x) described above. The term "thermosettable" (also referred to as "curable") means that the composition is capable of being subjected to conditions which will render the composition to a cured or thermoset state or condition.

The term "cured" or "thermoset" is defined by L. R. Whittington in Whittington's Dictionary of Plastics (1968) on page 239 as follows: "Resin or plastics compounds which in their final state as finished articles are substantially infusible and insoluble. Thermosetting resins are often liquid at some stage in their manufacture or processing, which are cured by heat, catalysis, or some other chemical means. After being fully cured, thermosets cannot be re-softened by heat. Some plastics which are normally thermoplastic can be made thermosetting by means of crosslinking with other materials."

In the first embodiment above, the epoxy resin composition, component (a), of the thermosettable epoxy resin composition of the present invention may be any of the epoxy resins described above with reference to Formula I.

In general, the concentration of the epoxy resin composition, component (a), present in the thermosettable resin composition of the present invention may vary depending on the end use application. For example, the amount of epoxy resin composition used may vary from about 97 wt % to about 10 wt % based on the total weight of the composition, in some embodiments. In other embodiments, the epoxy resin composition may be used in an amount ranging from about 20 wt % to about 97 wt % based on the total weight of the composition; and the epoxy resin composition may be used in an amount ranging from about 30 wt % to about 95 wt % based on the total weight of the composition, in yet other embodiments.

The curing agent (also referred to as a hardener or crosslinking agent), component (b), useful in the thermosettable epoxy resin composition of the first embodiment, may be selected, for example, from those curing agents well known in the art including, but are not limited to, anhydrides, carboxylic acids, amine compounds, phenolic compounds, polyols, or mixtures thereof. The term "curing agent" as used herein is intended to also include catalysts or co-catalysts used either alone or in conjunction with one or more other curing agents.

Examples of the curing agent useful in the present invention include any of the curing materials known to be useful for curing epoxy resin based compositions. Such materials include, for example, polyamine, polyamide, polyaminoamide, polyphenol, polymeric thiol, polycarboxylic acid and anhydride, polyol, and any combination thereof or the like. Other specific examples of the curing agent include dicyandiamide, tetrabromobisphenol A, phenol novolacs, cresol novolacs, bisphenol-A novolacs, phenol novolac of dicyclopentadiene, styrene-maleic acid anhydride (SMA) copolymers, the condensation product of DOP (9,10-dihydroxy-9-oxa-10-phosphaphenanthrene-10-oxide) with bisphenol A resole (for example as described in WO2005118604(A1), which is incorporated herein by reference); and any combination thereof. Preferred examples of the curing agent may include a phenol novolac, a cresol novolac, bisphenol A, dicyandiamide, and any combination thereof.

Preferred examples of the curing agent useful in the present invention may include bisphenol A; dicyandiamide; a phenol novolac such as bisphenol A novolac or phenol dicyclopentadiene novolac; a bromine-containing bisphenol A such as tetrabromobisphenol A (TBBA); a bromine-containing bisphenol A novolac; a phosphorus-containing bisphenol A novolac; or any combination thereof.

Dicyandiamide may be one preferred embodiment of the curing agent useful in the present invention. Dicyandiamide has the advantage of providing delayed curing since dicyandiamide requires relatively high temperatures for activating its curing properties; and thus, dicyandiamide can be added to a thermosetting resin and stored at room temperature (about 25° C.). Additionally, the curing profile of a resin composition using dicyandiamide may be conveniently modified using a catalyst, such as, for example, 2-methylimidazole (2-MI).

In general, the concentration of the curing agent or hardener, component (b), present in the thermosettable resin composition of the present invention may vary depending on the end use application. For example, the amount of curing agent used may vary from about 0.1 to about 150 parts per hundred parts thermosettable resin, by weight, in some embodiments. In other embodiments, the curing agent may be used in an amount ranging from about 5 to about 95 parts per hundred parts thermosettable resin, by weight; and the curing agent may be used in an amount ranging from about 10 to about 90 parts per hundred parts thermosettable resin, by weight, in yet other embodiments.

In the second embodiment above, the advanced epoxy resin composition, component (i), of the thermosettable advanced epoxy resin composition of the present invention may include any of the advanced epoxy resins described above with reference to Formula II.

In general, the concentration of the advanced epoxy resin composition, component (i), present in the thermosettable advanced epoxy resin composition of the present invention may vary depending on the end use application. For example, the amount of advanced epoxy resin composition used may vary from about 25 wt % to about 99 wt % based on the total weight of the composition, in some embodiments. In other embodiments, the advanced epoxy resin composition may be used in an amount ranging from about 30 wt % to about 97 wt % based on the total weight of the composition; and the advanced epoxy resin composition may be used in an amount ranging from about 40 wt % to about 95 wt % based on the total weight of the composition, in yet other embodiments.

The curing agent, component (ii), useful in the thermosettable advanced epoxy resin composition of the second embodiment, may be selected from one or more of the curing agents, component (b), described above with reference to the first embodiment.

In general, the concentration of the curing agent, component (ii), present in the thermosettable resin composition of the present invention may vary depending on the end use application. For example, the amount of curing agent used may vary from about 2 wt % to about 80 wt % based on the total weight of the composition, preferably from about 10 wt % to about 70 wt % based on the total weight of the composition; and more preferably from about 20 wt % to about 60 wt % based on the total weight of the composition.

In the third embodiment, the epoxy resin, component (x), of the thermosettable advanced reactive resin composition of the present invention may be any well epoxy resin useful in preparing the thermosettable advanced reactive resin composition of the present invention. The epoxy resin includes at least one epoxy resin or a combination of one or more epoxy resins. Epoxy resins are those compounds containing at least one vicinal epoxy group. The epoxy resin may be saturated or unsaturated, aliphatic, cycloaliphatic, aromatic or heterocyclic and may be substituted. The epoxy resin may also be monomeric, oligomeric or polymeric. The epoxy resin, component (x), useful in the present invention may be selected from any known epoxy resins in the art. An extensive enumeration of epoxy resins useful in the present invention is found in Lee, H. and Neville, K., "Handbook of Epoxy Resins," McGraw-Hill Book Company, New York, 1967, Chapter 2, pages 257-307; incorporated herein by reference.

The epoxy resins used in embodiments of the present invention disclosed herein may vary and may include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Any one or combinations of two or more of the epoxy resins may be used as the epoxy resin for preparing the thermosettable resin composition.

Particularly suitable epoxy resins known to the skilled worker are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, tetrabromobisphenol A, and the triglycidyl ether of para-aminophenol. Other suitable epoxy resins known to the skilled worker include reaction products of epichlorohydrin with cresol or phenol novolacs. It is also possible to use a mixture of two or more epoxy resins.

The epoxy resin useful in the present invention for the preparation of the epoxy resin composition, may be selected from commercially available products. For example, D.E.R.® 331, D.E.R. 332, D.E.R. 334, D.E.R. 580, D.E.N. 431, D.E.N. 438, D.E.R. 736, or D.E.R. 732 available from The Dow Chemical Company may be used. As an illustration of the present invention, the epoxy resin component (a) may be a liquid epoxy resin, D.E.R.® 383 (DGEBA) having an epoxide equivalent weight of 175-185, a viscosity of 9.5 Pa-s and a density of 1.16 gms/cc. Other commercial epoxy resins that can be used for the epoxy resin component can be D.E.R. 330, D.E.R. 354, or D.E.R. 332.

Other suitable epoxy resins useful as component (b) are disclosed in, for example, U.S. Pat. Nos. 3,018,262; 7,163,973; 6,887,574; 6,632,893; 6,242,083; 7,037,958; 6,572,971; 6,153,719; and 5,405,688; PCT Publication WO 2006/052727; U.S. Patent Application Publication Nos. 20060293172, 20050171237, 2007/0221890 A1; each of which is hereby incorporated herein by reference.

In a preferred embodiment, the epoxy resin useful in the composition of the present invention comprises any aromatic or aliphatic glycidyl ether or glycidyl amine or a cycloaliphatic epoxy resin.

In general, the choice of the epoxy resin used in the present invention depends on the application. However, diglycidyl ether of bisphenol A (DGEBA) and derivatives thereof are particularly preferred. Other epoxy resins can be selected from but limited to the groups of: bisphenol F epoxy resins, novolac epoxy resins, glycidylamine-based epoxy resins, alicyclic epoxy resins, linear aliphatic epoxy resins, tetrabromobisphenol A epoxy resins, and combinations thereof.

In general, the concentration of the epoxy resins present in the thermosettable resin composition of the present invention may vary depending on the end use application. For example, the amount of curing agent composition used may vary from about 20 wt % to about 80 wt % based on the total weight of the composition, preferably from about 25 wt % to about 70 wt % based on the total weight of the composition; and more preferably from about 30 wt % to about 70 wt % based on the total weight of the composition.

In the third embodiment, the at least one advanced reactive resin composition, component (y), of the thermosettable advanced reactive resin composition of the present invention may be any of the advanced reactive resin compositions described above with reference to Formula III.

In general, the concentration of the advanced reactive resin composition, component (y), present in the thermosettable resin composition of the present invention may vary depending on the end use application. For example, the amount of advanced reactive resin composition used may vary from about 10 wt % to about 90 wt % based on the total weight of the composition, in some embodiments. In other embodiments, the advanced hydroxyl-containing resin composition may be used in an amount ranging from about 20 wt % to about 80 wt % based on the total weight of the composition; and the advanced hydroxyl-containing resin composition may be used in an amount ranging from about 30 wt % to about 70 wt % based on the total weight of the composition, in yet other embodiments.

An optional thermoset resin, component (c), may be used in any of the above described thermosettable resin compositions. The optional thermoset resin may include, for example, at least one thermoset resin component selected from epoxy resins different from the resin component (a), (i), and (x); isocyanate resins, (meth)acrylic resins, phenolic resins, vinylic resins, styrenic resins, polyester resins, vinylester resins, silicone resins, melamine resins; and mixtures thereof. Preferably, an epoxy resin different from the resin component (a), (i), or (x), is employed as optional component (c) in the thermosettable resin composition.

In one preferred embodiment, the optional epoxy resin component useful in the present invention includes at least one epoxy resin different from the resin component (a), (i) and (x) used for preparing thermosettable resin composition. Any one or combinations of two or more of the epoxy resins previously described above may be used as the optional epoxy resin component (c), in the present invention for preparing the thermosettable resin composition. The epoxy resins may include conventional and commercially available epoxy resins.

Examples of the other optional epoxy resin different from component (a), (i) and (x), suitable for use in the present invention may include epoxidized bisphenol A; epoxidized dihydroxydiphenyl-cycloalkane; epoxidized phenolic novolac such as epoxidized phenol novolac, bisphenol A novolac, or epoxidized phenol dicyclopentadiene novolac; epoxidized bromine-containing bisphenol or brominated bisphenol A novolac; or any combination thereof, where 'epoxidized' means the reaction product of the phenolic compound with epichlorohydrin or related material.

In general, the optional thermoset resin, component (c), may be present in the thermosettable composition in an amount of from about 5 wt % to about 50 wt %; preferably, from about 5 wt % to about 40 wt %; and more preferably, from about 10 wt % to about 35 wt % based on the total weight of the composition.

An optional component useful in any of the thermosettable compositions of the present invention may include at least one catalyst. The catalyst used in the present invention may be adapted for polymerization, including homopolymerization, of the at least one thermosetting resin. Alternatively, catalyst used in the present invention may be adapted for a reaction between the at least one thermosetting resin and the at least one curing agent.

The catalyst useful as an optional component in the thermosettable composition of the present invention may be any catalyst well known in the art used for this purpose. For example, the catalyst may include compounds containing amine, phosphine, heterocyclic nitrogen, ammonium, phosphonium, sulfonium moieties, a substituted derivative thereof, and any combination thereof. Some non-limiting examples of the catalyst useful in the present invention may include, for example, ethyltriphenylphosphonium; benzyltrimethylammonium chloride; heterocyclic nitrogen-containing catalysts described in U.S. Pat. No. 4,925,901, incorporated herein by reference; imidazoles; triethylamine; and any combination thereof.

The selection of the catalyst useful in the present invention is not limited and commonly used catalysts for epoxy systems can be used. Also, the addition of a catalyst is optional and depends on the system prepared. When the catalyst is used, preferred examples of catalyst include tertiary amines, imidazoles, organophosphines, and acid salts.

Most preferred catalysts include tertiary amines such as, for example, triethylamine, tripropylamine, tributylamine, 2-methylimidazole, benzyldimethylamine, mixtures thereof and the like. Especially preferred are the alkyl-substituted imidazoles; 1-methylimidazole, 2-methylimidazole, 2-ethyl-4-methylimidazole, 2,5-chloro-4-ethyl imidazole; and phenyl-substituted imidazoles, and any mixture thereof.

Even more preferred embodiments of the catalyst suitable for the present invention include for example 2-methyl imidazole, 2-phenyl imidazole, 1,8-diazabicyclo[5.4.0]undec-7-ene (DBU), imidazole derivatives such as 2-methyl imidazole-epoxy resin adduct, such as EPON™ P101 (available from Hexion Specialty Chemicals), and any combination thereof.

In general, the concentration of the catalyst present in the thermosettable resin composition of the present invention may vary depending on the end use application. The amount of catalyst used may vary from about 0.1 to about 20 parts per hundred parts thermosettable resin, by weight, in some embodiments. In other embodiments, catalyst may be used in an amount ranging from about 1 to about 15 parts per hundred parts thermosettable resin, by weight; and from about 2 to about 10 parts per hundred parts thermosettable resin, by weight, in yet other embodiments. The specific amount of catalyst used for a given system may be determined experimentally through simple range finding experiments to develop the optimum in properties desired.

The thermosettable compositions of the present invention may include optional additives and fillers conventionally found in thermosettable resin systems such as for example epoxy resin systems. The thermosettable compositions of the present invention may optionally contain additives and/or fillers which are useful for their intended uses. The type and amount of the additives and/or fillers used in the thermosettable resin composition will vary depending on the intended use of the thermosettable resin composition.

For example, the optional additives and fillers useful in the present invention composition may include, but not limited to, one or more of the following: silica, glass, talc, metal powders, titanium dioxide, wetting agents, pigments, coloring agents, mold release agents, toughening agents, coupling agents, degassing agents, flame retardants (e.g., inorganic flame retardants, halogenated flame retardants, and non-halogenated flame retardants such as phosphorus-containing materials), ion scavengers, UV stabilizers, flexibilizing agents, tackifying agents, stabilizers, surfactants, flow modifiers, fillers, pigments or dyes, gloss control agents, antioxidants, matting agents curing initiators, curing inhibitors, thermoplastics, processing aids, UV blocking compounds, fluorescent compounds, UV stabilizers, inert fillers, fibrous reinforcements, antioxidants, impact modifiers including thermoplastic particles, and mixtures thereof. Additives and fillers may also include fumed silica, aggregates such as glass beads, polytetrafluoroethylene, polyol resins, polyester resins, phenolic resins, graphite, molybdenum disulfide, abrasive pigments, viscosity reducing agents, boron nitride, mica, nucleating agents, and stabilizers, among others. Fillers and modifiers may be preheated to drive off moisture prior to addition to the thermosettable resin composition. Additionally, these optional additives may have an effect on the properties of the composition, before and/or after curing, and should be taken into account when formulating the composition and the desired cured product. The above list is intended to be exemplary and not limiting. The preferred additives for the, formulation of the present invention may be optimized by the skilled artisan.

Preferably, the additives used in the thermosettable resin composition of the present invention include catalysts, flame retardants, solvents, fillers, reinforcement materials, co-catalysts, accelerators; and optionally other application-specific additives such as flame retardants, wetting agents, defoamers, adhesion promoters, fillers, pigments, dyes, stabilizers, UV-absorbers, and toughening agents. As is known in the art, it is possible to add other thermosetting monomers such as other epoxides, cyanates, maleimides, triazines, and benzoxazines, as well as other oligomers or polymers such as poly(phenylene oxide).

The concentration of the additional additives is generally between about 0 wt % to about 50 wt %, preferably between about 0.01 wt % to about 20 wt %, more preferably between about 0.05 wt % to about 15 wt %, and most preferably between about 0.1 wt % to about 10 wt % based on the weight of the total composition. Below about 0.01 wt %, the additives generally do not provide any further significant advantage to the resultant thermoset product; and above about 20 wt %, the property improvement(s) brought by these additives remains relatively constant.

Curable compositions may include from about 0.1 to about 50 volume percent optional additives in some embodiments. In other embodiments, curable compositions may include from about 0.1 to about 5 volume percent optional additives; and from about 0.5 to about 2.5 volume percent optional additives in yet other embodiments.

As one illustration of a thermosettable (i.e., the curable or hardenable) resin composition of the present invention disclosed herein, the thermosettable resin composition may include at least one epoxy resin composition, component (a), (i) or (x); and the at least one curing agent (b) and (ii) or a reactive compound (y). As aforementioned, in some embodiments, the curable compositions disclosed herein may additionally include a catalyst, an inorganic filler, one or more additives as described above; and/or other materials such as a reinforcing agent.

In general, there is no criticality of mixing the components of the thermosettable composition. Generally, the curable compositions may be formed by admixing the above components in stages or simultaneously. The desired amount of components used in the thermosettable or curable composition may depend on the expected end use.

The thermosettable resin composition generally has an average molecular weight in the range of from about 300 to about 40,000 grams per mole, preferably, from about 1000 to about 10000 grams per mole, more preferably, from about 1000 to about 5000 grams per mole, and most preferably, from about 1000 to about 3000 grams per mole.

The thermosettable resin compositions of the present invention may be cured in accordance with well known techniques used by those skilled in the art of curing conventional curable resins such as epoxy resins. The components of the formulation or composition of the present invention, including for example, a resin component (a) and a curing agent component (b), may be admixed in the appropriate ratio; and the resulting final thermosettable composition mixture may be subjected to curing conditions to form a thermoset. The term "thermoset" or "thermoset network structure" used herein refers to a substantially cured and crosslinked thermoset resin structure. This thermoset network structure is the cured resin obtained by curing the curable thermosettable resin described above.

For example, the curing reaction of the thermosettable composition may be conducted at a temperature, generally, between about 0° C. and about 250° C., preferably between about 25° C. and about 200° C., more preferably between about 40° C. and about 190° C. The time of curing the thermosettable resin composition may be for a predetermined period of time which can range from minutes up to hours, generally the reaction time is more than about 5 minutes and less than about 24 hours, preferably between about 5 minutes and about 6 hours, and more preferably between about 5 minutes and about 2 hours. The curing conditions of the thermosettable resin can also depend on the components used, and any optional components added to the composition such as a catalyst, if used. In other embodiments, curing may occur at a first temperature followed by a second temperature or post-treatment, such post-treatments ordinarily being at temperatures above 100° C., preferably between about 100° C. and 200° C.

In some embodiments, curing may be staged or "B-staged" to prevent uncontrolled exotherm, to modify processability, and for other known reasons. Staging, typically referred to as "B-staging", for example, includes curing for a period of time at a temperature followed by curing for a period of time at a higher temperature. B-staged curing may include two or more curing stages, and may commence at temperatures below about 180° C. in some embodiments, and below about 150° C. in other embodiments. In other embodiments the components of the thermosetting composition are combined with a solvent to reduce the viscosity. This solution, called a varnish, is used to coat a web of fiber such as glass. The solvent is then removed in a ventilated oven and the resin is B-staged. The coated fiber mat, called a prepreg, can be stacked, pressed, and heated to form a finished part such as an electrical laminate or other solid form.

Thermoset resins may be formed by curing the curable thermosettable resin compositions of the present invention as described above. Depending on the end use application, the resulting thermoset resins of the present invention may comprise a thermoset or a thermoset network structure with fillers, fibrous reinforcement materials, aspect shaped inorganic materials and/or other additives; wherein the thermoset network structure comprises a dihydroxydiphenyl-cycloalkane compound represented by the Formula I described above such as bisphenol cyclododecanone; or wherein the thermoset network structure comprises a diglycidyl ether of a dihydroxydiphenyl-cycloalkane compound represented by the Formula II described above such as a diglycidyl ether of bisphenol cyclododecanone; or comprising a combination of both.

The resulting thermoset obtained from the thermosettable resin composition of the present invention displays excellent thermo-mechanical properties, such as good toughness and mechanical strength, while maintaining high thermal stability. It has been discovered that, for example, the dihydroxydiphenyl-cycloalkane compounds of the present invention provide several improved properties to the thermoset resins of the present invention when compared to conventional phenolic hardeners and/or chain extenders. For example, compared to conventional thermoset resins, the thermoset resins of the present invention comprising the dihydroxydiphenyl-cycloalkane compounds have the following improved properties while maintaining its other properties such as high temperature stability and a high cross-linking density:

(1) an improved mechanical property such as improved toughness—based on difunctional resins with low crosslink density and therefore relatively tough;

(2) an improved thermal property such as a higher glass transition temperatures of greater than about 150° C., preferably greater than about 170° C., and more preferably greater than about 190° C. and above when cured with dicyandiamide;

(3) a higher humidity resistance property (a high moisture resistance or, in other words, a low water uptake);

(4) a lower dielectric constant/dissipation factor (Dk/Df) property; and (5) based on an epoxy resin that exhibits low viscosity of less than about 150 mPa-s and preferably less than about 120 mPa-s.

The Tg will depend on several factors such as epoxy resin and hardeners selected, other additives, and any optional epoxy resin that is chosen. For example, in one embodiment, generally Tg is from about 50° C. to about 220° C., preferably from about 80° C. to about 210° C., and more preferably from about 100° C. to about 200° C.

Without limiting the present invention to any one theory, it is theorized that the addition of the alkyl ring between the bisphenol groups in the dihydroxydiphenyl-cycloalkane structure may reduce the rotations of the bisphenol groups by steric hindrance and, as a result, the presence of the dihydroxydiphenyl-cycloalkane compound structure increases the glass transition temperatures (Tg) of the host resins compared to conventional resins which comprise bisphenol derivatives without the alkyl ring.

The increase of the glass transition temperatures of a host resin comprising the dihydroxydiphenyl-cycloalkane compounds of the present invention is generally in the range of from about 10° C. to about 100° C. or higher depending on factors such as type of hardener, resin, and catalyst used in curing the resins; and the curing conditions. The Young's moduli of a host resin comprising dihydroxydiphenyl-cycloalkane compounds is also found to be lower compared to resins comprising bisphenol derivatives without the alkyl ring. Thus, the compositions of the present invention exhibit a higher Tg. It is theorized, that the addition of the alkyl ring between the bisphenol groups in the dihydroxydiphenyl-cycloalkane compounds may lower the cross-linking density due to higher steric hinderance and thus, provides improved toughness to thermosettable resins such as epoxy resins.

The thermosettable resin compositions of the present invention may be useful for many applications such as those applications requiring the final thermoset resin to have high heat resistance and good storage stability. For example, the thermoset resins may be useful in castings, pottings, encapsulation, coatings, composites, or laminates, more specifically, in electrical or electronic castings, electrical or electronic pottings, electrical or electronic encapsulation, electrical laminates, structural composites, or protective coatings. The thermoset resins of the present invention may also be used in other various end-use applications including, for example, powder coatings; adhesives, structural laminates, electrical laminates, coatings, castings, structures for the aerospace industry, as circuit boards and the like for the electronics industry, as well as for the formation of skis, ski poles, fishing rods, and other outdoor sports equipment. The compositions disclosed herein may also be used in electrical varnishes, encapsulants, semiconductors, general molding powders, filament wound pipe, storage tanks, liners for pumps, and corrosion resistant coatings, among others.

The present invention is useful in manufacturing articles from the cured composition of the present invention. The article may include for example a casting, a potting, an encapsulation, a coating, a composite, or a laminate. The article may also include for example, a printed wire board, an electrical or electronic casting, an electrical or electronic potting, an electrical or electronic encapsulation, an electrical laminates, a structural composite, or a protective coating.

EXAMPLES

The following examples and comparative examples further illustrate the present invention in detail but are not to be construed to limit the scope thereof.

Various terms and designations used in the following examples include for example as follows: D.E.R.™ 330 is a diglycidyl ether of bisphenol A having an epoxy equivalent weight (EEW) between 177 g/eq and 189 g/eq, available from The Dow Chemical Company; D.E.R.™ 560 is a diglycidyl ether of tetrabromobisphenol A with an epoxy equivalent weight (EEW) at about 455 g/eq, supplied by The Dow Chemical Company; Dowanol™ PM is a solvent containing propylene glycol methyl ether, supplied by The Dow Chemical Company; Plenco 13943 is a phenol novolac epoxy resin, available from Plastics Engineering Co.; "A1 catalyst" is a catalyst made of ethyl triphenyl phosphonium acid acetate in methanol, available from Alfa Aesar; EPON™ P101 is a catalyst available from Hexion Chemical; "DICY" stands for dicyandiamide; "DMA" stands for Dynamic Mechanical Analysis; "DSC" stands for Differential Scanning calorimetry; "EEW" stands for epoxy equivalent weight; "HEW" stands for hydroxyl equivalent weight; "2-MI" stands for 2-methyl-imidazole; "TBBA" stands for tetrabromo bisphenol A, which has an equivalent weight of 272, supplied by The Dow Chemical Company; XZ92747 is bisphenol A novolac hardener having a bisphenol A content about 21% by weight, commercially available as KBE F4113 from Kolon Chemical (from Korea); XZ92755 is a bisphenol A novolac hardener based on KBE F4127 has lower bisphenol A content about 17% by weight, commercially available from Kolon Chemical (from Korea); and Herinol KBE F4127 is a bisphenol A novolac hardener based on KBE F4127 has lower bisphenol A content about 17% by weight, commercially available from Kolon Chemical (from Korea).

The following standard analytical equipments and methods are used in the Examples:

Epoxy equivalent weight (EEW) was measured by a colorimetric titration of epoxy resin samples (about 0.4 mg) with 0.1 M perchloric acid in the presence of tetraethylammonium bromide in glacial acetic acid. Crystal violet was employed as indicator according to ASTM D 1652 method.

The glass transition temperature (Tg) was measured by Differential Scanning Calorimetry (DSC) from 50° C. to 220° C. with a heating ramp of 20° C./minute.

The reactivity of a resin solution was measured by placing a sample of the resin solution on the surface of a hot plate at 170° C. The reactivity measurement of the resin solution is reported as elapsed time in second required for gelation ("gel time") at 170° C.

The softening point was determinate with a Mettler FP80 with a heating ramp of 3° C./minute from room temperature (about 25° C.) to 200° C.

Thermo-gravimetric Analysis (TGA) was used to measure the decomposition temperature Td. TGA was performed by using a thermo-gravimetric analyzer TGA2950 from TA Instruments which is fitted with an auto-sampling device and connected to a personal computer. TGA analyzer was operated under nitrogen atmosphere. The decomposition temperature Td was measured according to IPC-TM-650-2.3.40 with from 50° C. to 700° C. with a heating ramp of 10° C./minute. Td was determined at percent weight loss (except otherwise mentioned, i.e. 1%, 2%, 5%, or 10% weight loss). The typical experimental error was ±1° C.

Example 1

Advanced Reaction of Bisphenol Cyclododecanone with D.E.R.™ 330

A 66.8 grams (g) sample of bisphenol cyclododecanone (189.8 mmol) was dissolved in 133.1 grams of D.E.R. 330 (371.8 mmol) in a 500 ml glass reactor at 140° C. to form a mixture. The mixture was cooled to 80° C. and then 100 milligrams of an A1 catalyst solution (70% solids in methanol) was added to the mixture to start the reaction of the bisphenol cyclododecanone with D.E.R. 330. The advanced reaction was carried out at 150° C. to form Advanced Resin A. After 1 hour, the Advanced Resin A was characterized by titration. The EEW of the Advanced Resin A obtained from the titration was 520 g/eq (EEW$_{theory}$=551 g/eq). The Tg of the Advanced Resin A was measured by DSC with a heating ramp of 10° C./minute. The Tg was 54° C.

Comparative Example A

A 52.5 g sample of bisphenol A (230.3 mmol) was dissolved in 147.4 grams of D.E.R. 330 (411.7 mmol) in a 500 ml glass reactor at 140° C. The mixture was cooled to 80° C. and then 100 milligrams of an A1 catalyst solution (70% solids in methanol) was added to the mixture to start the advancement reaction of bisphenol A with D.E.R. 330. The reaction was carried out at 150° C. to form Comparative Advanced Resin A. After 1 hour, the Comparative Advanced Resin A was characterized by titration. The EEW of the Comparative Advanced Resin A obtained from the titration was about 569 g/eq (EEW$_{theory}$=552 g/eq). The Tg of the Comparative Advanced Resin A was measured by DSC with a heating ramp of 10° C./minute. The Tg was 49° C.

The advanced bisphenol cyclododecanone resin (Example 1) has higher resin Tg than the advanced bisphenol A resin (Comparative Example A). A higher Tg for a resin can be beneficial to the resin's storage stability.

Example 2

Curing the Advanced Resin of Bisphenol Cyclododecanone and D.E.R.™ 330

A 20.0 g sample of the Advanced Resin A (EEW=520 g/eq) obtained from Example 1 above was mixed with 0.48 grams of dicy and 0.25 grams of EPON P101. The mixture was cured for 2 hours at 200° C. to form Cured Resin A. The Tg of the Cured Resin A was measured by DSC with a heating ramp of 10° K/minute. The Tg of Cured Resin A was 141° C.

Comparative Example B 20.0 grams of the Advanced Resin B (EEW=569 g/eq) obtained from Comparative Example A above was mixed with 0.45 grams of dicy (equivalent wt=14 g/eq) and 0.26 grams of EPON P101.

The mixture was cured for 2 hour at 200° C. to form Cured Resin B. The Tg of Cured Resin B was measured by DSC with a heating ramp of 10° C./minute. The Tg of Cured Resin B was 115° C.

The cured resins of Example 2 and Comparative Example B show the Tg's for Cured Resin A (advanced bisphenol cyclododecanone resin, Example 2) and Cured Resin B (advanced bisphenol A resin, Comparative Example B) with a similar EEW. The use of the bisphenol cyclododecanone illustrates that Cured Resin A has an increased Tg over Cured Resin B of about 26° C.

Example 3 and Comparative Example C

The toughness of two resins (Resin C and Comparative Resin C) was measured by DMA. The cured resin of Example 2 which comprises Resin C is an advanced bisphenol cyclododecanone resin prepared using the procedure in Example 1. Resin C was cured with Plenco 13943 using the procedure in Example 2. The cured resin is referred to herein as "Cured Resin C" (Example 3).

Comparative Resin C is a conventional bisphenol A, DER 330. Comparative Resin C was cured with Plenco 13943 [herein "Comparative Cured Resin C" (Comparative Example C)] using the procedure of Comparative Example B.

Cured Resin C and Comparative Cured Resin C have similar glass transition temperature (Tg) at about 130° C. The toughness of the above two resins can be compared because the resins have similar glass transition temperatures (Tg).

Toughness may be defined by a drop in Young's modulus (E'). The two resins get less stiff (modulus decreases) as a result of the glass transition at about 130° C. The Young's modulus (E') of Cured Resin C decreases from about $5\times10^9$ Pa before the Tg at 130° C. to about $3\times10^7$ Pa after the Tg at 130° C.

The Young's modulus (E') of Cured Resin C in the rubber modulus range (after Tg reaches 130° C.) has a lower Young's modulus (E') (improved toughness) than that of Comparative Cured Resin C in the same rubber modulus range. Accordingly, Cured Resin C has an improved toughness by using bisphenol cyclododecanone over Comparative Cured Resin C which uses a conventional bisphenol A.

The results of Examples of the present invention show that an epoxy resin comprising a diglycidyl ether of a dihydroxydiphenyl-cycloalkane compound has a higher resin glass transition temperature (resin Tg) than a conventional epoxy resin such as those based on bisphenol A (see Example 1 and Comparative Example A). The cured epoxy resin of the present invention shows a higher cured glass transition temperature (cured Tg) than an epoxy resin comprising a conventional epoxy resin based on bisphenol A (see Example 2 and Comparative Example B). The cured epoxy resin of the present invention also has improved mechanical properties such as toughness compared to a conventional epoxy resin cured by phenolic hardeners; and therefore, the epoxy resin of the present invention has improved resistance to impact (see Example 3 and Comparative Example C).

Example 4

Laminates Produced from Advanced Bisphenol Cyclododecanone Resin

Part A. Advanced Bisphenol Cyclododecanone with D.E.R.™ 330

A 99.88 g sample of bisphenol cyclododecanone (0.57 mol) was solved in 399.88 grams of D.E.R.™ 330 (2.22 mol) in a 500 ml glass reactor at 140° C. to form a mixture. The mixture was cooled to 80° C. and then 231 mg of an A1 catalyst solution (70% solids in methanol) was added to the mixture. The resulting mixture with the A1 catalyst solution was heated to about 150° C. An advanced reaction of the bisphenol cyclododecanone and the D.E.R.™ 330 was carried out at 150° C. for about 1 hour to form an Advanced Resin E.

The EEW of the Advanced Resin E, measured by titration, was 297 g/eq (EEW$_{theory}$ is 302 g/eq). The Tg of the Advanced Resin E, measured by DSC, was 13° C.

75.0 grams of the Advanced Resin E (EEW=297 g/eq) obtained from the above reaction and 29.5 grams of Herinol KBE F4127 (HEW=117) was solved in 75.0 g Dowanol™ PM to form a Resin F. The reactivity (i.e. gel time in second) of the Resin F was adjusted to 280 second by adding 400 mg of the 2-MI solution (20% solids in Dowanol™ PM).

Part B. Prepregs and Laminates

Prepregs were prepared by coating 47% by weight of Resin F prepared in Part A above (calculated without solvent, i.e. with 100% solid content) on 53% by weight of style 7628 glass cloth (Porcher 731 finish). The solvent (Dowanol™ PM) in Resin F was evaporated in an oven which temperature was set at about 165° C. for about 5 minutes to form the prepregs.

The prepregs prepared above were used to produce laminates without any further modifications as follows: 8 sheets (each 20 cm×20 cm) of the prepregs were pressed for 1 hour at about 190° C. in a flow press with pressure at about 0.7 bar to form the laminates.

Example 5

Brominated Advanced Bisphenol Cyclododecanone Resin

A mixture of 150 grams (based on 100% solid content) of bisphenol cyclododecanone, 150 grams of D.E.R.™ 560 (based on 100% solid content with 58.8% Br), and 200 grams of Dowanol™ PM solvent was charged in a reactor. The mixture was warmed up to 60° C. to dissolve the bisphenol cyclododecanone and the D.E.R.™ 560 in the Dowanol™ PM solvent. The mixture was then heated up to 100° C. with 0.643 grams of A1 catalyst solution (70% solids in methanol) added to the mixture. The mixture was heated continuously until the Dowanol™ PM solvent started to boil at reflux (137° C.). The advanced reaction of the bisphenol cyclododecanone and the D.E.R.™ 560 was carried out at 137° C. for about 150 minutes to form a brominated Advanced Resin G. The brominated Advanced Resin G was cooled down to room temperature.

The EEW and the Tg of the brominated Advanced Resin G were measured according to the methods stated above. The results are listed as follows: the EEW was 297 g/eq (EEW$_{theo}$ is 302 g/eq) and the Tg was 13° C.

The brominated Advanced Resin G was used to form a resin formulation with hardeners, XZ92747 and XZ92755, available from The Dow Chemical Company.

About 59.95% by weight of the brominated Advanced Resin G obtained from the above reaction and 33.29% by weight of XZ92747 and 6.63% by weight of XZ92755 were solved in 0.13% by weight of 2-MI solution (20% solids in Dowanol™ PM) to form a resin formulation.

The reactivity of the resin formulation was measured three times with an average result of 249 seconds. The Tg were measured by DSC (film) by scanning two times from 50° C. to 220° C. at 20° C./minute with an average result of 120° C. The resin formulation was subsequently cured on a hot plate at 170° C. for 10 minutes and 190° C. for 90 minutes to form a cured brominated advanced bisphenol cyclododecanone resin product.

Example 6

Formation of an Epoxidized Bisphenol Cyclododecanone (Bisphenol Cyclododecanone Modified Epoxy Resin)

Epoxidation of bisphenol cyclododecanone was carried out by reacting the bisphenol cyclododecanone with epichlorohydrin with a ratio of 7.5:1 (epichlorohydrin to hydroxyl (—OH) equivalent) according to the following procedure:

A two liter, three necks, round bottom glass reactor equipped with a thermostatically controlled heating mantle was charged with the bisphenol cyclododecanone (176 g, 1.0 hydroxyl equivalent), epichlorohydrin (694 g, 7.5 moles) and isopropanol (373 g, 35% weight of the epichlorohydrin used). The reactor was maintained at 50° C. during the experiment. The reactor was additionally equipped with a condenser (maintained at −15° C.), a thermometer, a Claisen adaptor, an overhead nitrogen inlet (1 LPM N$_2$ used), and a stirrer assembly (PTFE paddle, glass shaft, variable speed motor). An initial sodium hydroxide solution (20% in water, 180 grams) was added from a side arm vented addition funnel over 20-30 minutes. The resulting mixture was stirred to give a slurry of the bisphenol cyclododecanone in the epichlorohydrin and isopropanol.

After 20 minutes of post-reaction, stirring was stopped. An aqueous layer and an organic layer were formed. The aqueous layer was removed from the mixture. Heating and stiffing of the organic layer were resumed to 50° C. Dropwise addition of a second portion of sodium hydroxide (20% in water, 80 grams) was completed over 20 minutes while maintaining the temperature at 50° C.

Similarly, after 20 minutes of post-reaction, stiffing was stopped; and an aqueous layer and an organic layer were formed. The aqueous layer was removed from the mixture. The organic layer was washed with 3-4 portions (250 milliliters each) of deionized water until a pH of 7 of the organic layer was achieved. Rotary evaporation of the organic layer using a maximum oil bath temperature of 75° C. was used to remove the bulk of volatiles presence in the organic layer. Further rotary evaporation at 125° C. for 2-3 hour (16 mbar) gave 230 grams of epoxidized bisphenol cyclododecanone, which was a transparent, colorless liquid. The resulting liquid was solidified to a brittle solid at room temperature (about 25° C.).

Example 7

Advanced Brominated Epoxy Resin Formed by Advanced Reaction of Epoxidized Bisphenol Cyclododecanone and TBBA A 7.63 g sample of an epoxidized bisphenol cyclododecanone product (EEW 236 g/eq) obtained from Example 6 above and 4.52 grams of TBBA (EEW 272 g/eq, 58.8% Br) were molten in an aluminum cup on a hot plate to obtain a homogenous mixture. About 0.0049 grams of A1 catalyst was added to the homogeneous mixture. An advanced reaction of the epoxidized bisphenol cyclododecanone product and TBBA was carried out at 120° C. for 1 hour to form an advanced resin. The advanced resin was then dissolved in 2.98 grams of acetone (80% solids in acetone) with DICY to form a resin mixture. The resin mixture was cured on a hot plate at 170° C. for 10 minutes and 190° C. for 90 minutes to form an advanced brominated epoxy resin product.

The reactivity of the advanced brominated epoxy resin was measured three times. The resin had an average reactivity of 205 seconds. The Tg of the resin was measured by DSC (film). The film was scanned 2 times from 50° C. to 220° C. at 20° C./minute. The resin had an average Tg of 168.3° C. Film decomposition temperature (Td) of the brominated epoxy resin was measured by TGA according to the procedure stated above. The results of the Td measurements are shown in the following Table I.

TABLE I

| Weight Loss (%) | Film (Td) Temperature (° C.) |
|---|---|
| 1 | 210.7 |
| 2 | 250.0 |
| 5 | 297.7 |
| 10 | 300.9 |

Example 8 and Comparative Example D

Part A. Prepreg Procedure

Prepregs were prepared by impregnating glass web (Porcher style Nr.7628/36 amine silane finish) with a varnish mixture. One varnish mixture (Example 8) was made from the advanced brominated resin of Example 7; and another varnish mixture (Comparative Example D) a conventional epoxidized bisphenol A advanced with TBBA. The prepregs were formed using a Caratsch pilot treater 3 meters in length. The "Hand Lay-ups" were prepared by pouring the varnish onto the glass web. The varnish was spread across the glass web before the glass web was passed through the treater rollers. The resin impregnated web was then passed through the treater; and heated at a temperature of between 175-180° C. to form the resulting prepreg.

Part B. Laminate Procedure

A laminate was prepared by stacking 8 plies of prepregs from Part A above with copper foils on both sides. The 8 plies were pressed at 20 N/cm² from room temperature to 190° C. with a heating ramp of 3° K/min and kept 90 minutes.

The following Table II shows a comparison of the properties of laminates made from a conventional epoxidized bisphenol A advanced with TBBA (Comparative Example D) and laminates made from an epoxidized bisphenol cyclododecanone product of Example 7 advanced with TBBA (Example 8).

TABLE II

| | Comparative Example D | Example 8 |
|---|---|---|
| Formulation | Epoxidized Bisphenol A Advanced with TBBA | Epoxidized Bisphenol Cyclododecanone Advanced with TBBA |
| Parts Solid | 100 | 100 |
| Dicyandiamide (DICY) | 2.8 | 3.0 |
| 2-methylimidazole | 0.08 | 0.10 |
| Laminate Properties: | | |
| Glass Transition Temperature Tg (° C.) | 130-140 | 167-169 |
| Decomposition Temperature Td (° C.) | 315 | 298 |

Example 9

Synthesis of eCDON

A two liter, three necks, round bottom glass reactor equipped with a thermostatically controlled heating mantle was charged with the bisphenol of cyclododecanone (~176 grams, 1.0 hydroxyl equivalent), epichlorohydrin (~694 grams, 7.5 moles) and isopropanol (~373 grams, 35% weight of the epichlorohydrin used). The reactor was additionally equipped with a condenser (maintained at −15° C.), a thermometer, a Claisen adaptor, an overhead nitrogen inlet (1 LPM $N_2$ used), and a stirrer assembly (Teflon paddle, glass shaft, variable speed motor). After dissolving at 50° C., a solution of sodium hydroxide (20% in water, 180 grams) was added to a side arm vented addition funnel over 20-30 minutes. Stirring commenced to give slurry of the bisphenol of cyclododecanone in epichlorohydrin and isopropanol. The temperature was maintained at 50° C. during the reaction. After 20 minutes of post-reaction, stiffing was stopped and the aqueous layer was removed from the organic layer.

Heating and stiffing of the organic layer was resumed to 50° C. Dropwise addition of a second portion of sodium hydroxide (20% in water, 80 grams) to the organic layer was completed over 20 minutes while maintaining the temperature at 50° C. After 20 minutes of post-reaction time, stiffing was stopped, and the aqueous layer was removed from the organic layer product. Then the organic layer was washed with 3-4 portions (250 milliliters each) of deionized water until a pH of 7 of the organic layer was achieved.

Rotary evaporation of the organic layer using a maximum oil bath temperature of 75° C. was used to remove the bulk of the volatiles. Further rotary evaporation at 125° C. for 2-3 hour (16 mbar) gave ~225-235 grams of transparent, colorless liquid which solidified to a brittle solid at room temperature (~25° C.). The resulting resin was the diglycidyl ether of bisphenol cyclododecanone (herein "eCDON") and had the following properties described in Table III:

TABLE III

| Example 1 Resin | Tg (° C.)[1] | Softening Point (° C.)[2] | Melt viscosity at 150° C. (mPa · s) | EEW measured by titration (g/eq) |
|---|---|---|---|---|
| eCDON | 31 | 74.6 | 120 | 236 |

[1]From −20° C. to 150° C. with 10° K./minute
[2]With 2° K./minute

Example 10

Preparation of a Powder Composition Using eCDON

A 20 g sample of the eCDON (EEW 236 g/eq) prepared in Example 9 above, 1.06 g dicy (equivalent wt=14 g/mol) and 0.35 g EPON P101 were mixed 10 seconds at 15° C. to a fine powder. The powder was than cured for 30 minutes at 200° C. The glass transition temperature (Tg) of the resulting thermoset was recorded from 50° C. to 300° C. with a heat ramp of 10° C./minute. The Tg of the resulting thermoset was about 198° C.

Comparative Example E

Preparation of a Powder Composition Using a Conventional Resin

A 20 g sample of an epoxy resin D.E.R. 330 (EEW 179 g/eq) (a diglycidyl ether of bisphenol A material, commercially available from The Dow Chemical Company), 1.4 g dicy (equivalent wt=14 g/eq) and 0.35 g EPON P101 were mixed at 120° C. and 20 minutes at 180° C. The resulting product was mixed 10 seconds at 150° C. to a fine powder which was than cured for 30 minutes at 200° C. The Tg of the resulting product was recorded from 50° C. to 300° C. with a heat ramp of 10° C./minute. The Tg of the resulting thermoset was about 143° C.

As shown in the above Example 9 and Comparative Example E, the use of the diglycidyl ether of bisphenol cyclododecanone (Example 1) as compared to the use of the diglycidyl ether of bisphenol A material (Comparative Example E) resulted in a thermoset product with a Tg of 198° C. versus 143° C., respectively. The use of the diglycidyl ether of bisphenol cyclododecanone increased the Tg of the resulting thermoset product by 55° C.

Example 11

Cure of eCDON with Dicy

A sample of eCDON (4.62 g), dicy (0.34 g), and 2-phenylimidazole (0.038 g) was mixed by cryogrinding. The cryogrinding procedure involved adding the solids to a stainless steel cylinder with threaded ends, adding a metal ball, cooling the contents in liquid nitrogen, and shaking the assembly for 10 minutes. The cylinder was placed in a nitrogen-purged bag and allowed to warm to room temperature (about 25° C.). A portion of the powder from the cylinder was placed in an aluminum pan, and heated in a vacuum oven at 190° C. for 90 minutes to form a clear casting. A Tg of 202° C. was observed by DSC. This casting was cut into 4 pieces, each piece was weighed, and all four pieces were placed in a steam autoclave at 121° C. for 90 minutes. The weight gain of each piece was expressed as a percentage, and the 4 values were averaged to give a value of 2.3 wt %.

Comparative Example F

Cure of D.E.R.™ 331 with Dicy

The same procedure described in Example 11 was repeated except that the following reactants were used: D.E.R. 331 (bisphenol A diglycidyl ether, 4.51 g), dicy (0.44 g), and 2-phenylimidazole (0.05 g). A Tg of 139° C. was observed by DSC, and the water absorption was 3.9 wt %.

The invention claimed is:

1. An epoxy resin composition comprising an epoxy resin represented by the following general Formula I:

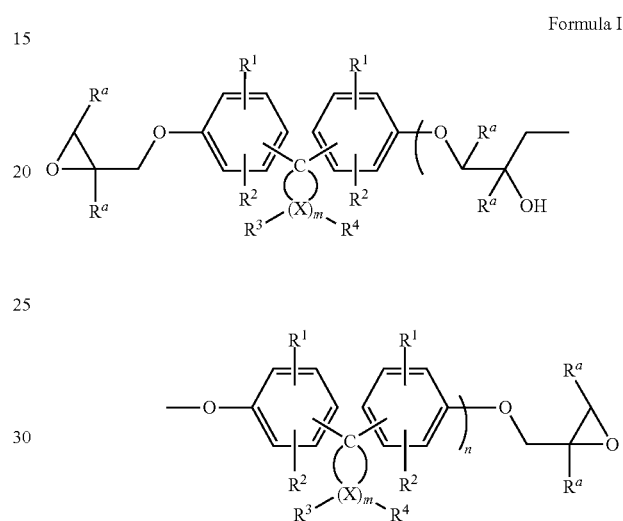

Formula I

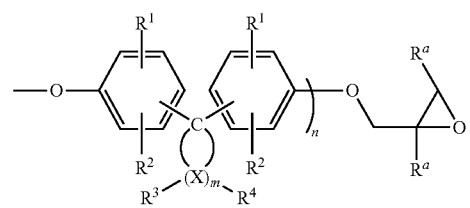

wherein $R^a$ is a hydrogen or methyl group, $R^1$ and $R^2$, independently from each other, each represents a hydrogen atom, a halogen, a substituted or unsubstituted alkyl group, a substituted or unsubstituted aryl group, or a substituted or unsubstituted aralkyl group; a nitrile group; a nitro group; a substituted or unsubstituted alkoxy group; X is $CH_2$, $CH(R^3)$, or $C(R^3)(R^4)$; m is an integral number between 8 and 20; and $R^3$ and $R^4$, independently from each other, each represents a hydrogen atom, a halogen, a substituted or unsubstituted alkyl group, a substituted or unsubstituted aryl group, or a substituted or unsubstituted aralkyl group; n is an integer having a value from greater than 0 to about 10.

2. An advanced epoxy resin composition comprising the reaction product of (a) one or more hydroxyl-containing compounds with (b) a stoichiometric excess of one or more of the epoxy resins of claim 1.

3. The advanced epoxy resin composition of claim 2, represented by the following general chemical structure of Formula II:

Formula II

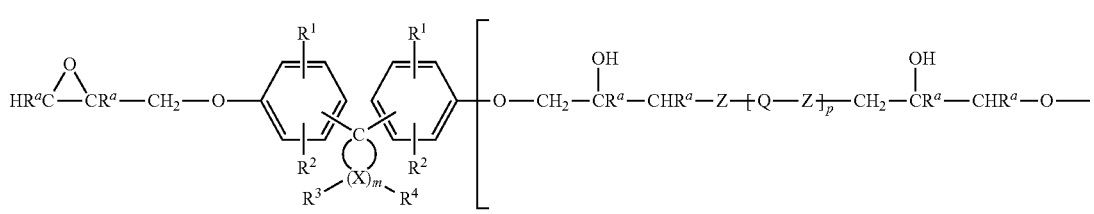

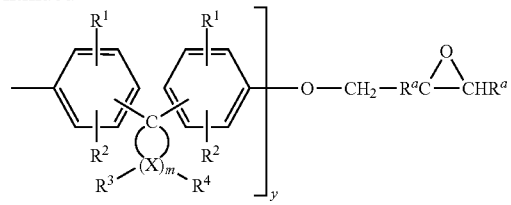

wherein $R^a$, $R^1$, $R^2$, $R^3$, $R^4$, X, and m are as defined in Formula I, y is an integer having a value from 1 to about 20; p is an integer having a value of 1 to about 20; Q is a hydrocarbylene moiety; and each Z is independently selected from the group consisting of O, S, $-NR^b$, wherein $R^b$ is a hydrocarbyl moiety.

4. A process for preparing an epoxy resin composition of Formula I of claim 1 comprising reacting (a) at least one epoxy resin and (b) at least one compound having an average of more than one reactive hydrogen atom per molecule, excluding an epoxy functionality, wherein the reactive hydrogen atom is reactive with an epoxide group in said epoxy resin composition represented by Formula I.

5. The process of claim 4, wherein the bisphenol compound, component (b), comprises a bisphenol compound represented by the following general Formula IV:

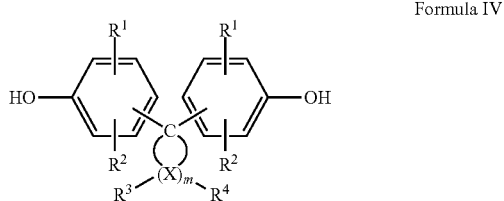

Formula IV wherein R1 and R2, independently from each other, each represents a hydrogen atom, a halogen, a substituted or unsubstituted alkyl group, a substituted or unsubstituted aryl group, or a substituted or unsubstituted aralkyl group; X is $CH_2$, CH(R3), or C(R3)(R4); m is an integral number between 8 and 20; and R3 and R4, independently from each other, each represents a hydrogen atom, a halogen, a substituted or unsubstituted alkyl group, a substituted or unsubstituted aryl group, or a substituted or unsubstituted aralkyl group.

6. The process of claim 4, wherein epoxy resin component (a) comprises from about 10 percent by weight to about 80 percent by weight based on total weight of the composition; and wherein component (b) comprises from about 20 percent by weight to about 80 percent by weight based on total weight of the composition.

* * * * *